United States Patent
Codilian

(10) Patent No.: US 6,792,669 B2
(45) Date of Patent: Sep. 21, 2004

(54) METHOD FOR ALLOCATING DISK DRIVE SPINDLE MOTORS BASED ON AN OPERATING CHARACTERISTIC

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 462 days.

(21) Appl. No.: 10/008,764

(22) Filed: Nov. 30, 2001

(65) Prior Publication Data

US 2003/0103285 A1 Jun. 5, 2003

(51) Int. Cl.[7] .......................... G11B 5/127; H04R 31/00
(52) U.S. Cl. .......................... 29/603.03; 360/31; 360/69
(58) Field of Search .......................... 29/603.03; 360/31, 360/55, 75, 73.03, 77.02, 78.04, 97.03, 98.01, 69; 324/210, 212, 226; 73/1.82, 1.84, 66

(56) References Cited

U.S. PATENT DOCUMENTS 6,467,153 B2 * 10/2002 Butts et al. .............. 29/603.03
6,499,002 B1 * 12/2002 Lancaster .................. 702/191
6,636,817 B2 * 10/2003 Fioravanti .................... 702/75
6,643,080 B1 * 11/2003 Goodner et al. .............. 360/31

* cited by examiner

Primary Examiner—Alan T. Faber
(74) Attorney, Agent, or Firm—Milad G. Shara, Esq.; Knobbe, Martens Olson & Bear

(57) ABSTRACT

A population of disk drives includes a first disk drive configuration that has a spindle motor made according to the spindle motor design and a second disk drive configuration that has a spindle motor made according to the spindle motor design. A population of spindle motors are manufactured according to a spindle motor design. Each of the spindle motors in the population of spindle motors has a track-following characteristic in a range. A first group of spindle motors that correspond to a first portion of the range are allocated to the first disk drive configuration. A second group of spindle motors that correspond to the second portion of the range are allocated either to the second disk drive configuration or to the first disk drive configuration.

26 Claims, 8 Drawing Sheets

METHOD FOR ALLOCATING DISK DRIVE SPINDLE MOTORS BASED ON AN OPERATING CHARACTERISTIC

BACKGROUND OF THE INVENTION

1. Field of the Invention

The present application relates to a method for improving the servo performance of disk drives. More specifically, the present application involves allocating individual spindle motors in a single population of spindle motors to a disk drive design that can be made with different configurations.

2. Description of the Related Art

Disk drives permanently store information in the form of magnetic transitions written onto and read from one or more rigid disks, referred to as "platters." These transitions are written by a recording head in generally concentric tracks on a magnetic media that is formed on one or more platters. The platters are rotated by a spindle motor. A servo system is provided in the disk drive that includes a plurality of servo sectors on the platters to enable the head to access a particular track. The servo system also enables the head to remain on the track, i.e., to track-follow. Because the track-following performance is an important characteristic of a disk drive servo system, several metrics have been developed to quantify it, including position error signal ("PES").

A variety of factors influence PES performance, including the number of platters mounted on the spindle motor. Disk drive manufacturers typically design a disk drive platform capable of being assembled with one or more platters. By adding one or more platters, the disk drive manufacturer can offer disk drive products having different data storage capacity. Increasing the number of platters in a disk drive generally increases PES because spindle motor runout increases. Non-repeatable runout ("NRRO") is one type of runout that appears irregularly. NRRO in the spindle motor is mainly caused by imperfections in the shape of the ball bearings and the supporting parts around them, by their pre-load structure, and by system vibration. Disk drive manufacturers have encouraged their spindle motor suppliers to continually improve the spindle motor NRRO of the population of spindle motors shipped to the disk drive manufacturer to improve PES performance. Spindle motor manufacturers have been asked to ship only disk drives that have NRRO performance that will work in the disk drive configuration with the maximum number of platters. Spindle motor manufacturers also have been asked to adapt to tighter spindle motor NRRO tolerances so that the disk drive designers can achieve higher data track density.

While spindle motor manufacturers historically have adapted to improved NRRO performance requirements, current and future NRRO specifications may not be achievable in a timely and cost effective manner. In any case, the current practice of requiring the spindle motor supplier to ship only a distribution of spindle motors that will work in the worst-case drive configuration results in significant over-design of the spindle motors installed in disk drive configurations having, for example, fewer than the maximum number of platters. It also can result in higher scrap cost, which either reduces the profits earned by the disk drive manufacturer or increases the cost of the disk drive to the customer.

SUMMARY OF THE INVENTION

A first aspect of the present invention is a method of manufacturing a population of disk drives. The population of disk drives comprises a first disk drive configuration that has a spindle motor and a second disk drive configuration that has a common spindle motor. A population of spindle motors are manufactured according to a spindle motor design. Each of the spindle motors in the population has a track-following characteristic in a range. The range comprises a first portion and a second portion. A first group of the spindle motors are identified that correspond to the first portion of the range. A second group of spindle motors are identified that correspond to the second portion of the range. The first group of spindle motors are allocated to the first disk drive configuration. The second group of spindle motors are allocated to the second disk drive configuration.

Another aspect of the present invention is an apparatus that allocates a spindle motor from a population of spindle motors according to a track-following characteristic to an appropriate disk drive configuration. The track-following characteristic of the population of spindle motors is in a range. The apparatus comprises a vibration isolating platform that has an electrical connection to which the spindle motor can be electrically connected. The apparatus also has a platter pack, a connector for attaching the platter pack to the spindle motor, and a measurement device that measures the track-following characteristic.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
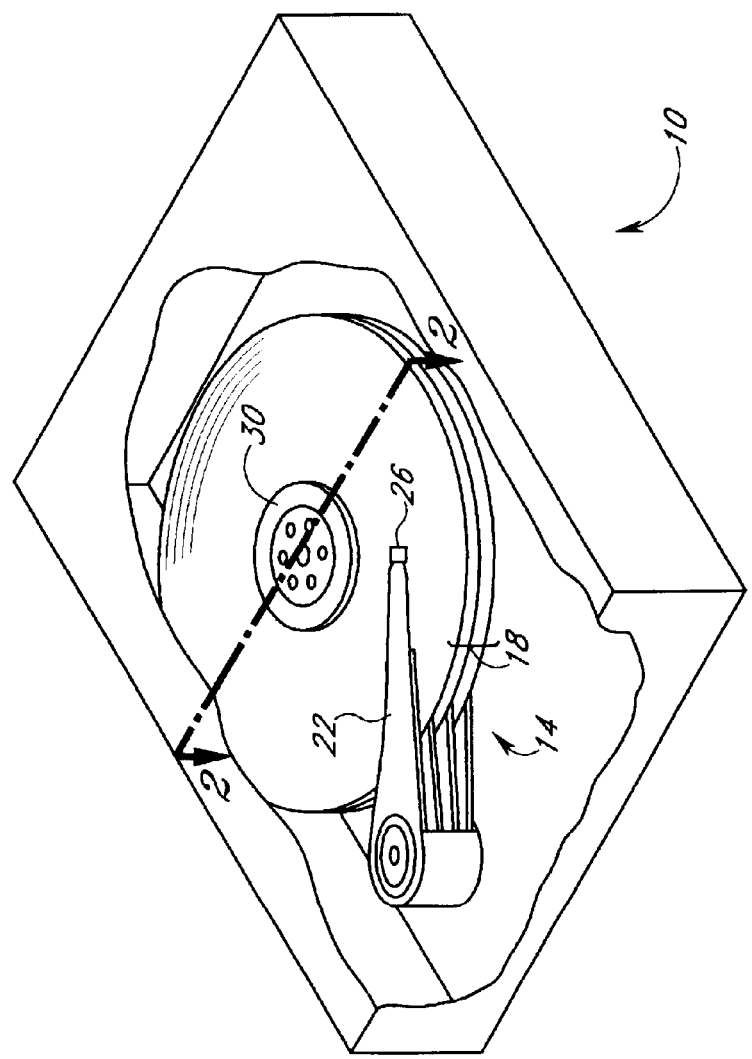
FIG. 1 is a pictorial representation of a disk drive comprising a HDA and a spindle motor.

FIG. 1 shows a disk drive 10 comprising a head-disk assembly (HDA) 14 that includes an array of platters 18, a rotary actuator 22, a plurality of recording heads 26 attached to actuator arms of the actuator 22, and a spindle motor 30. The disk drive 10 also includes a voice-coil motor that positions the actuator 22 and the heads 26.

As mentioned above, the spindle motor 30 may exhibit some spindle motor runout, which has a deleterious effect on the PES performance of the disk drive 10 into which the spindle motor 30 is incorporated. As the PES increases, the ability of the disk drive 10 to store data also degrades because either data density of the disk drive 10 must be reduced or a significant percentage of the data storage area must be disqualified when the assembled disk drive 10 is tested. As mentioned above, increasing the number of platters in the array of platters 18 mounted on the spindle motor 30 also tends to increase PES.

Figure 2:
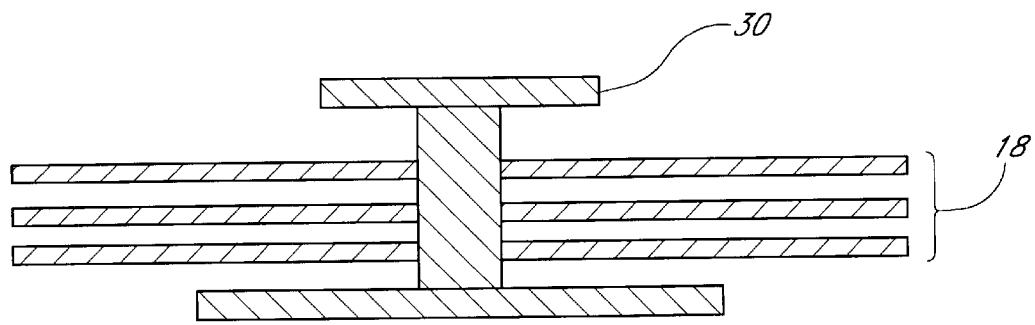
FIG. 2 shows a cross section of the platters and spindle motor of one configuration of the disk drive of FIG. 1.
Figure 2A:
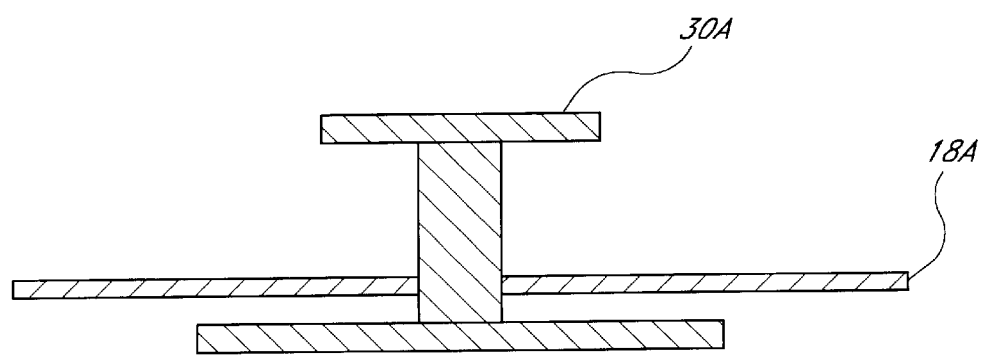
FIG. 2A shows a cross section of the platter and spindle motor of another configuration of the disk drive of FIG. 1.
Figure 2B:
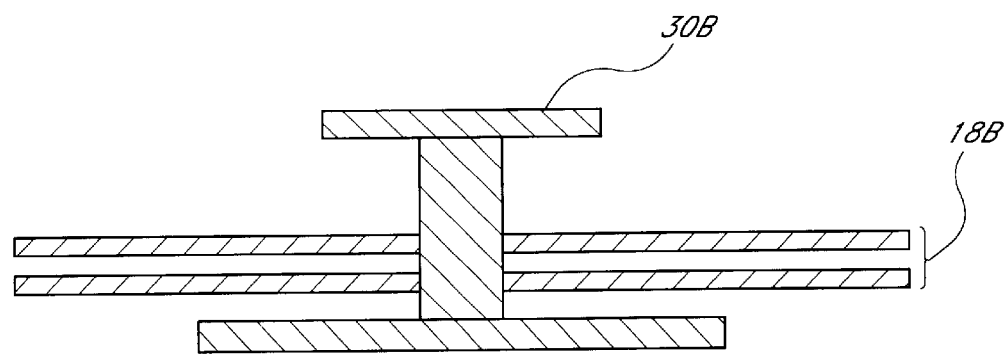
FIG. 2B shows a cross section of the platters and spindle motor of yet another configuration of the disk drive of FIG. 1.

FIGS. 2–2B illustrate one embodiment of the methods described herein. In this embodiment, the disk drive 10 may alternately be made in a first configuration, in a second configuration, or in a third configuration, each of the configurations having a different number of platters in the array of platters 18. FIG. 2A shows the first configuration wherein the disk drive 10 has one platter in an array of platters 18A. FIG. 2B shows the second configuration wherein the disk drive 10 has two platters in an array of platters 18B. FIG. 2 shows the third disk drive configuration wherein the disk drive 10 has three platters in the array of platters 18. In this embodiment, any combination of disk drives 10 of the first configuration, the second configuration, and the third configuration may be produced.

The configurations could be based on other operational variables of the disk drive 10 that affect PES, such as spindle speed, acoustic performance, or seek performance. For example, in another embodiment the first configuration could be a disk drive 10 having a spindle motor 30 operating at relatively low spindle motor speed, the second configuration could be a disk drive 10 having a spindle motor 30 operating at a nominal spindle motor speed, and the third configuration could be a disk drive 10 having a spindle motor operating at a relatively high spindle motor speed.

In another embodiment, the first configuration has a low acoustic performance, i.e., a relatively high emission of sound by the disk drive 10 related to operation of the spindle motor 30. The second configuration has a nominal acoustic performance, i.e., a nominal emission of sound by the disk drive 10 related to operation of the spindle motor 30. The third configuration has a high acoustic performance, i.e., a relatively low emission of sound by the drive 10 related to operation of the spindle motor 30.

In another embodiment, the first configuration has a low seek performance, i.e., a relatively long seek time, a relatively long arrival time, or both long seek time and a long arrival time. The second configuration has a nominal seek performance, i.e., a nominal seek time, a nominal arrival time, or both a nominal seek time and a nominal arrival time. The third configuration has a high seek performance, i.e., a relatively short seek time, a relatively short arrival time, or both a short seek time and a short arrival time.

In yet another embodiment, the configurations could relate to a combination of operational variables that are PES contributors. For example, the first configuration could be a disk drive 10 having the array of platters 18A with a single platter mounted on the spindle motor 30, the second configuration could be a disk drive 10 having the array of platters 18B with two platters mounted on the spindle motor 30, and the third configuration could be a disk drive 10 having the array of platters 18B having two platters mounted on the spindle motor 30, but operating at relatively high spindle speed. Similarly, other disk drive configurations relating to other disk drive operational variables that affect PES could be combined to create different configurations. These other operational variables include, but are not limited to, seek performance and acoustic performance, as discussed above.

Figure 3:
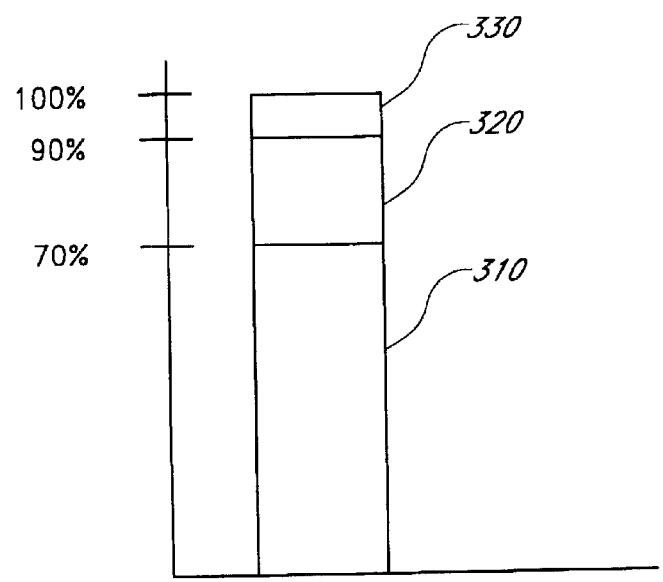
FIG. 3 shows an example of a target percentage disk drive for each of a first disk drive configuration, a second disk drive configuration, and a third disk drive configuration.

As shown in FIG. 3, the combination of disk drives 10 of the first configuration, the second configuration, and the third configuration is preferably based on a target percentage of disk drives 10 of any of the first configuration, the second configuration, or the third configuration to be sold. For example, as shown in FIG. 3, a first target percentage 310 of disk drives of the first disk drive configuration is preferably about 70%. A second target percentage 320 of disk drives of the second disk drive configuration is preferably about 20%, and a third target percentage 330 of disk drives of the third disk drive configuration is preferably about 10%. It will be recognized that other combinations of percentages of the three disk drive configurations also are possible.

Figure 4:
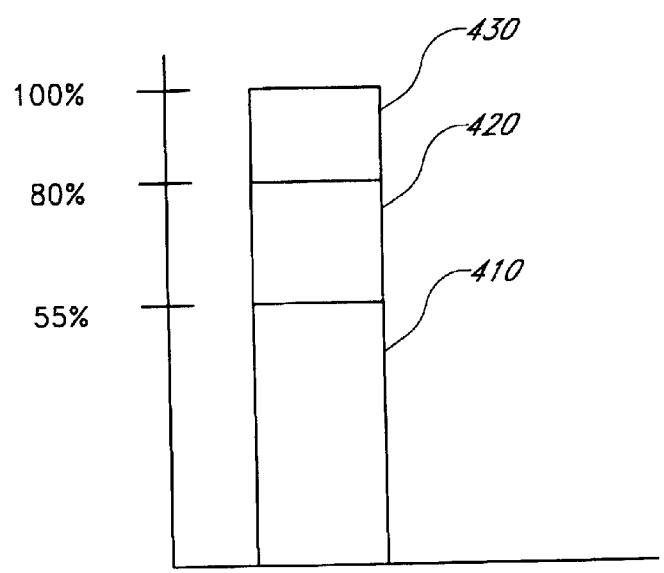
FIG. 4 shows an example of a target percentage of spindle motors that can be initially directed to the first disk drive configuration, the second disk drive configuration, or the third disk drive configuration.

In one embodiment, in order to produce the desired target percentages 310, 320, and 330 of disk drive spindle motors are divided into three groups. As shown in FIG. 4, a first target percentage 410 of spindle motors 30 is identified for a first group of spindle motors 30. The first target percentage 410 is preferably about 55%. A second target percentage 420 of spindle motors is identified for a second group of spindle motors. The second target percentage 420 is preferably about 25%. A third target percentage 430 of spindle motors 30 is identified for a third group of spindle motors 30. The third target percentage 430 is preferably about 20%. Note that the third target percentage 430 of spindle motors is at least as great as, and is preferably greater than the third target percentage 330 of disk drives of the third configuration. Also, the sum of the third target percentage 430 and the second target percentage 420 of spindle motors is at least as great as, and is preferably greater than the sum of the third target percentage 330 and the second target percentage 320 of disk drives of the second configuration. Thus the target percentages 420, 430 provide a buffer to increase the likelihood of being able to produce the desired target percentages 320, 330 of disk drives.

The percentages 410, 420, and 430 could also be based on the performance of the sample group or the entire population of spindle motors 30. Of course, the entire population of spindle motors 30 are still required to meet a predetermined specification. Again, it will be recognized that other combinations of percentages of the three spindle motor groups also are possible.

Figure 5:
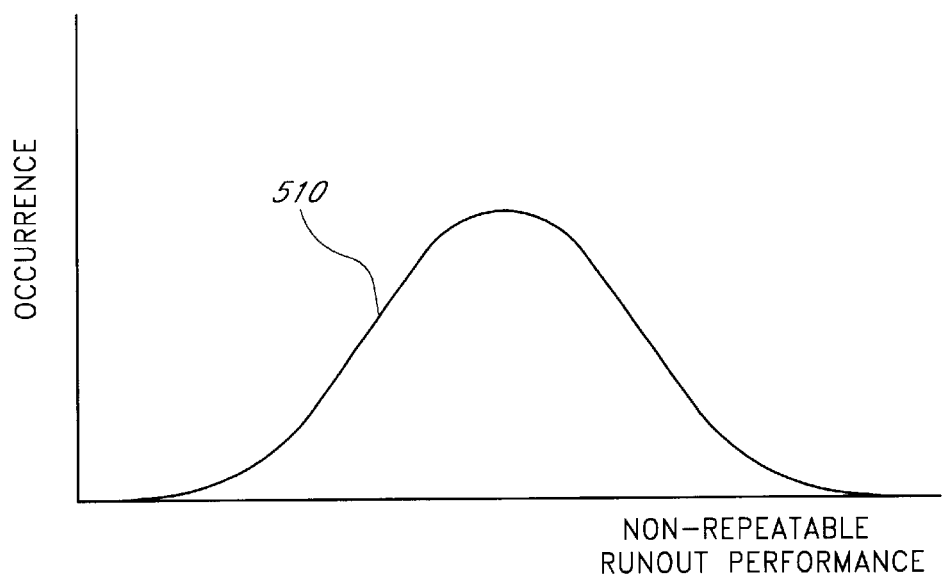
FIG. 5 shows an example of a distribution of a spindle motor operating characteristic, such as NRRO.

FIG. 5 illustrates a distribution 510 of a spindle motor operating characteristic that varies randomly over a range. In the embodiment of FIG. 5, the x-axis represents the independent variable, which is measured non-repeatable runout measured on bare spindle motors 30. The y-axis represents the number of occurrences for each randomly occurring value of non-repeatable runout. In one embodiment, the distribution 510 has the familiar bell shape of the gaussian distribution. As is known, the average non-repeatable runout performance of the population of spindle motors 30 will coincide with the highest point on the distribution 310, which is also the most frequently occurring value. Other features of the gaussian distribution are well known and will not be further recited.

In other embodiments, the distribution of other operating characteristics of the spindle motors 30 could be plotted as in FIG. 5 and used in connection with the methods disclosed and claimed herein. For example, non-repeatable runout could be measured in a simulated disk drive environment. The simulated disk drive environment could be created by using a platter pack, as is described in more detail below in connection with FIG. 10. In another variation, the operating characteristic could be a track following characteristic. PES is another operating characteristic that could be used in connection with the methods disclosed herein. An acoustic characteristic of individual spindle motors 30 could be plotted as a distribution similar to that shown in FIG. 5 in yet another variation. Alternately, an acoustic characteristic generated using the platter pack arrangement of FIG. 10 could be used. Other operating characteristics can also be used in connection with the methods disclosed and claimed herein. For example, the magnitude of the displacement of the spindle motor from a nominal axis of rotation at specific frequencies could be measured with a capacitive probe, with or without a platter pack.

Figure 6:
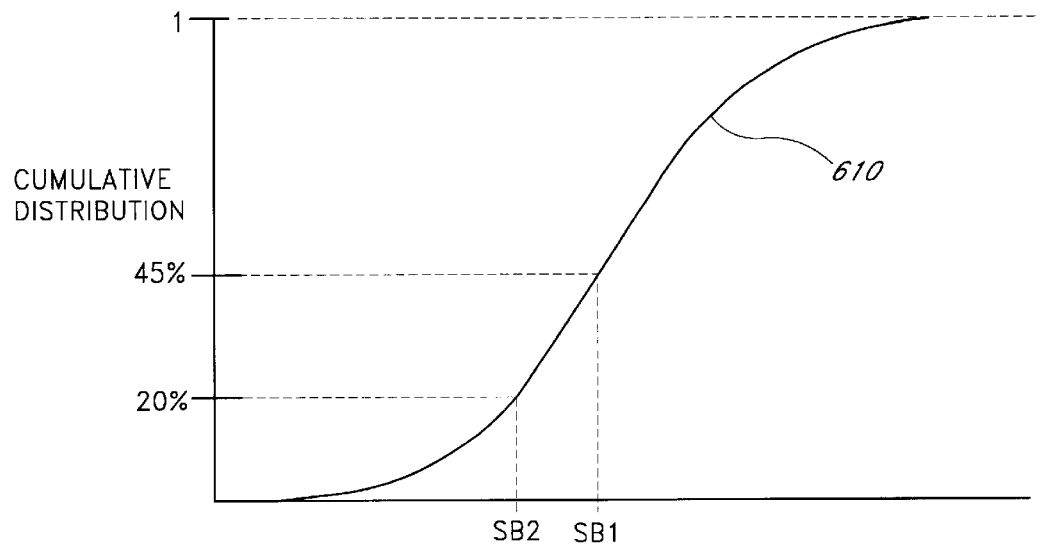
FIG. 6 illustrates an cumulative distribution function corresponding to the spindle motor operating characteristic distribution shown in FIG. 5.

FIG. 6 shows a cumulative distribution function 610 of the distribution 510 of FIG. 5. A cumulative distribution function is a function that gives the probability that a value of random variable is less than or equal to the independent variable of the function. The cumulative distribution function 610 is also the integration of the distribution 510, i.e., the area under the curve 510. For any given value of the operating characteristic within the range plotted along the x-axis, the cumulative distribution function yields the probability that any individual spindle motor 30 will have a value of the operating characteristic that is less than or equal to the given value of the operating characteristic. The value of the cumulative distribution function 610 corresponding to the value of the operating characteristics at the right-most end of the x-axis approaches one (i.e., 100%) because all spindle motors 30 will have an operating characteristic value that is less than or equal to that right-most value. As will be discussed in more detail below in connection with FIGS. 8 and 9, the cumulative distribution function 610 can be used to group spindle motors 30 for use in different configurations of disk drives 10 in a population of disk drives.

Figure 7:
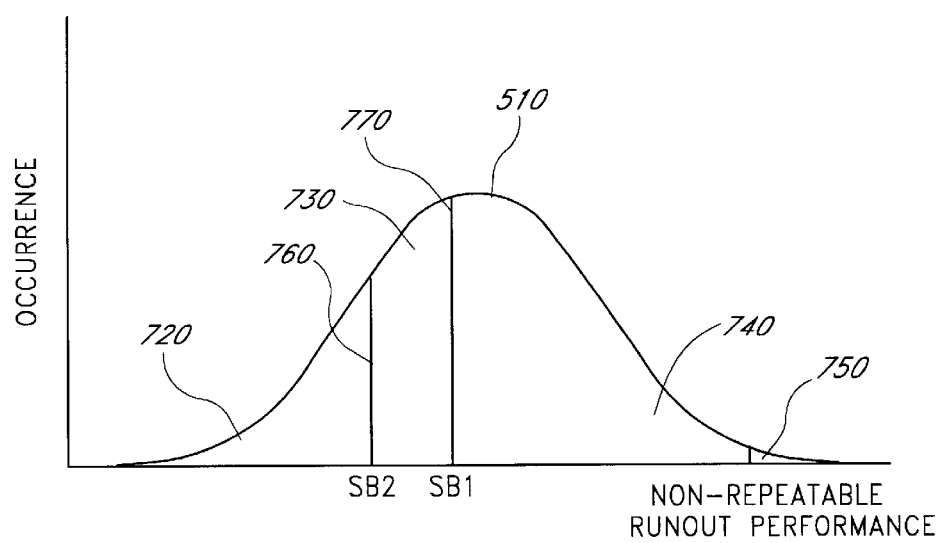
FIG. 7 shows the distribution of FIG. 5 with one sorting embodiment superimposed thereon.

FIG. 7 shows the distribution 510 with one spindle motor allocation embodiment superimposed thereon. As in FIG. 5, the x-axis of FIG. 7 represents the independent variable, which is measured non-repeatable runout measured on bare spindle motors 30. The y-axis of FIG. 7 represents the number of occurrences for each randomly occurring value of non-repeatable runout. In the embodiment of FIG. 7, the range of the operating characteristic comprises a first portion 740, a second portion 730, and a third portion 720. The third portion 720 extends from zero to a second spindle motor sort boundary 760. The second portion 730 extends from the second spindle motor sort boundary 760 to a first spindle motor sort boundary 770. The first portion 740 is all values occurring within the distribution 510 that are not in the first portion 720 or in the second portion 730, and that are within the range. In another embodiment, the second portion 730 of the range of non-repeatable runout is all values not in the first portion 740, i.e., the second portion 720 and the third portion 730 are combined. As will be understood by one skilled in the art, there may be one or more portions of the distribution 510 that are not within the range, as indicated at 750. Spindle motors corresponding to operating characteristics within the portion 750 are therefore not provided to the disk drive manufacturer.

Figure 8:
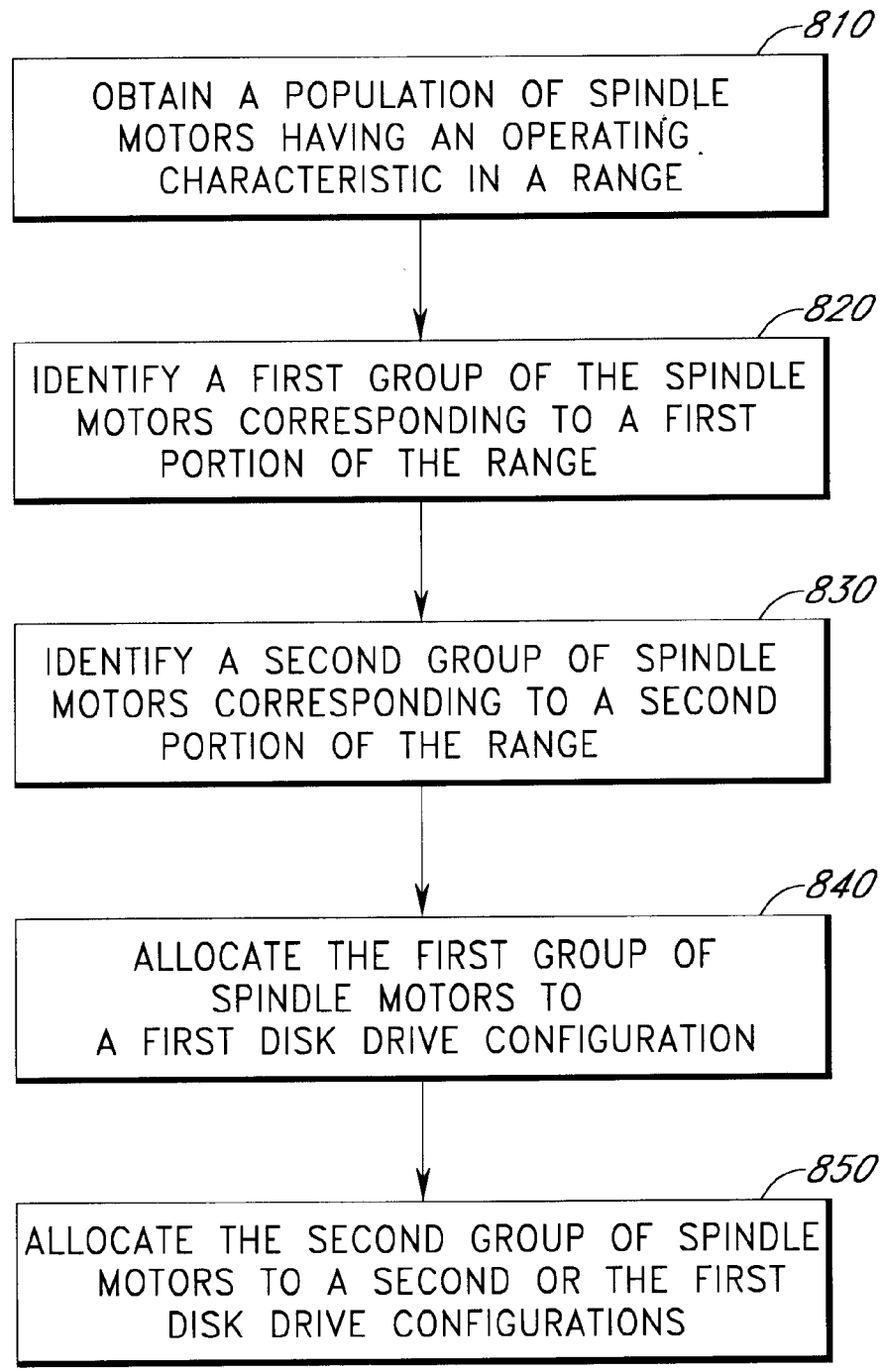
FIG. 8 illustrates one embodiment of the method for allocating disk drive spindle motors based on an operating characteristic.

FIG. 8 shows one embodiment of a method of manufacturing a population of disk drives 10. As described above, in one embodiment the population of disk drives 10 comprises a first disk drive configuration that has a spindle motor 30. The first disk drive configuration could be a one platter configuration, as shown in FIG. 2A. In one variation, the first disk drive configuration could comprise a disk drive 10 having at least one platter. The population of disk drives 10 also comprises a second disk drive configuration that has a spindle motor 30. The second disk drive configuration could be a two platter configuration, as shown in FIG. 2B. In another variation, the second disk drive configuration could comprise at least two platters.

In a step 810, a population of spindle motors 30 is obtained. The spindle motors 30 could be obtained from a supplier, manufactured or both obtained from a supplier and manufactured. The spindle motors 30 have an operating characteristic in a range, such as the operating characteristic non-repeatable runout measured on bare spindle motors illustrated in FIGS. 5 and 7. As described in connection with the embodiment of FIG. 7, the range comprises the first portion 740 and the second portion 730. Although FIG. 7 shows non-repeatable runout, the operating characteristic can be any of a number of other spindle motor performance metrics, e.g., an acoustic metric, any of the other metrics recited above, or any other similar metric.

In a step 820, a first group of the spindle motors 30 that correspond to the first portion 740 of the range are identified. In a step 830, a second group of the spindle motors 30 that correspond to the second portion 730 of the range are identified. In this embodiment, the second portion 730 of the range corresponds to all spindle motors within the range that are not in the first portion, i.e., the portions 720 and 730 are combined. In a step 840, the first group of spindle motors 30 are allocated to the first disk drive configuration. In a step 850, the second group of spindle motors 30 are allocated to the first disk drive configuration, the second disk drive configuration, or to both the first and the second disk drive configurations.

In another embodiment, the method could also comprise determining a target percentage of the population of disk drives 10 corresponding to the second configuration. As described above, if the second configuration includes an additional platter(s), the target percentage could be the market demand for disk drives having that capacity point. Upon determining a target percentage of disk drives, the method could further comprise measuring the operating characteristic for each of a sample group of the population of spindle motors 30 and setting a sort boundary such as the first spindle motor sort boundary 770 of FIG. 7. The first spindle motor sort boundary 770 of the measured operating characteristic defines the first portion 740 of the range and the second portion 730 of the range, and is set to produce at least the target percentage of the population of disk drives 10 corresponding to the second configuration.

The method could also comprise measuring the operating characteristic of each of the spindle motors 30 in the population and tagging the spindle motors 30 having a measured operating characteristic in the second portion 730 of the range. These spindle motors are then used to produce at least the target percentage of the population of disk drives corresponding to the second configuration. The method could also comprise tagging the spindle motors 30 having a measured operating characteristic in the first portion 740 of the range to produce disk drives of the first configuration. As discussed above, if the method involves producing only two configurations, the second portion 730 of the range and the third portion 720 of the range could be combined. There are several ways to tag spindle motors 30. For example, each spindle motor could have a serial number. The apparatus that measures the operating characteristic, such as that shown in FIG. 10, could be provided with the serial number and could match the measured operating characteristic with the serial number, as well as the appropriate spindle motor group based on the measured operating characteristic. In one variation, the apparatus could simply provide the serial number and the grouping. Other tagging methods are known to those skilled in the art.

Figure 9:
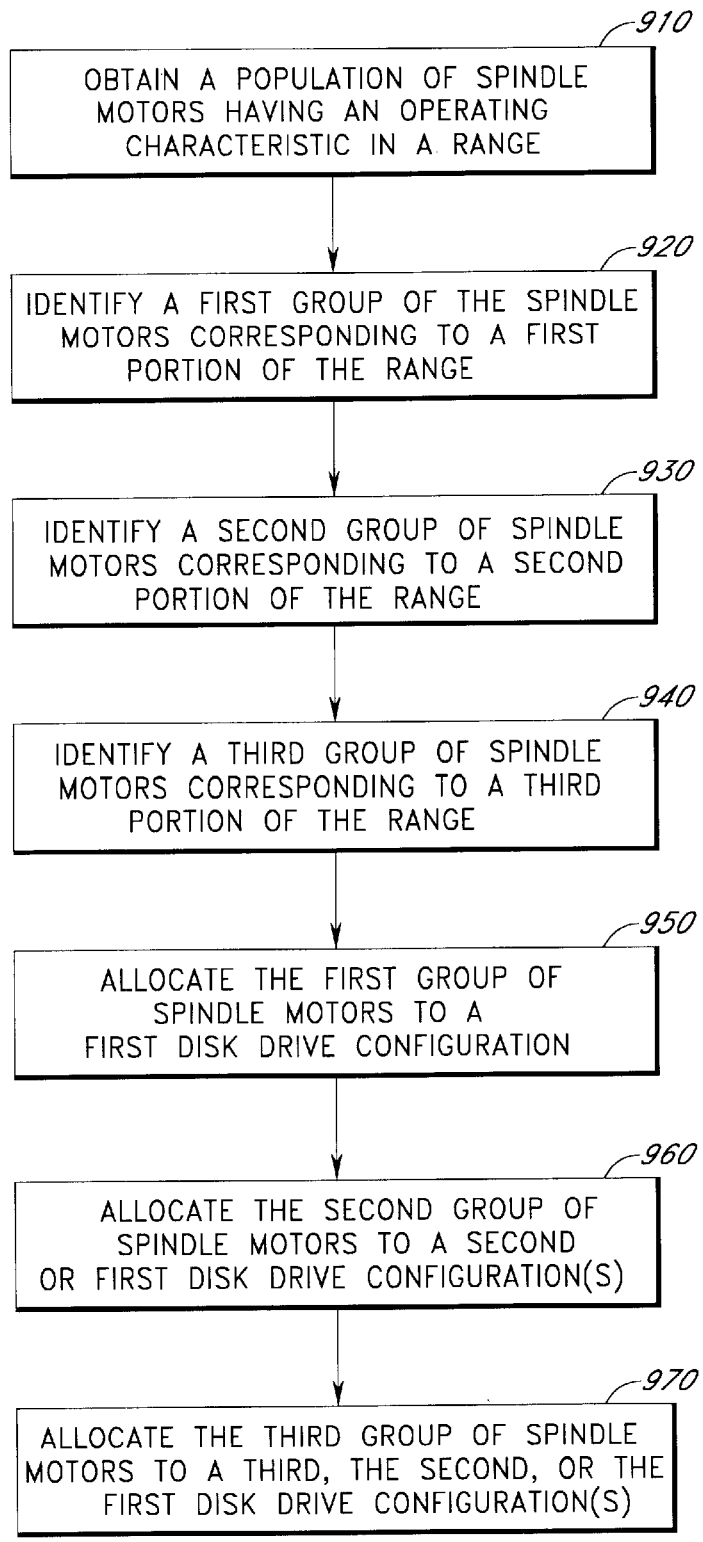
FIG. 9 illustrates another embodiment of the method for allocating disk drive spindle motors based on an operating characteristic.

Other embodiments are also possible. FIG. 9 illustrates another embodiment of the method for allocating disk drive spindle motors based on an operating characteristic. As described above, in the population of disk drives 10 could comprises a first disk drive configuration, a second disk drive configuration, and a third disk drive configuration.

In a step 910, a population of spindle motors 30 is obtained. The spindle motors 30 have an operating characteristic in a range, such as the operating characteristic non-repeatable runout measured on bare spindle motors illustrated in FIGS. 5 and 7. As described in connection with FIG. 7, the range comprises the first portion 740, the second portion 730, and the third portion 720.

In a step 920, a first group of the spindle motors 30 that correspond to the first portion 740 of the range are identified. In a step 930, a second group of the spindle motors 30 that correspond to the second portion 730 of the range are identified. In a step 940, a third group of the spindle motors 30 that correspond to the third portion 720 of the range are identified. In a step 950, the first group of spindle motors 30 are allocated to the first disk drive configuration. In a step 960, the second group of spindle motors 30 are allocated to the first disk drive configuration, the second disk drive configuration, or to both the first and the second disk drive configurations. In a step 970, the third group of spindle motors 30 are allocated to the third disk drive configuration. The third group of spindle motors 30 could also be allocated to any of the first disk drive configuration, the second disk drive configuration, or the third disk drive configuration once the target percentage of disk drives of the third configuration is achieved.

This embodiment could also comprise setting more than one spindle motor sort boundary. In this embodiment, the target percentage of any of the first configuration of disk drives, the second configuration of disk drives, and the third configuration of disk drives is determined. Then, the operating characteristics of a sample group of the population of spindle motors 30 could be measured. Then the second spindle motor sort boundary 760 and the first spindle motor sort boundary 770 of the measured operating characteristic could be set to define the third portion 720, the second portion 730, and the first portion 740 of the range.

The cumulative distribution function of FIG. 6 can be used to set the spindle motor sort boundaries 760, 770. In one example, the third target percentage of spindle motors 430, and the second target percentage of spindle motors 420 are determined. In this embodiment, the third target percentage 430 is 20%, and the second target percentage 420 is 25%. The first target percentage of spindle motors could be the remainder of the population of spindle motors, in this example, 55%. The x-axis value of the function 610 corresponding to 20% is SB2, which corresponds to the second spindle motor sort boundary 760 in FIG. 7. The x-axis value corresponding to 45% (20%+25%) is SB1, which corresponds to the first spindle motor sort boundary 770 shown in FIG. 7. As discussed above, a buffer preferably is provided by making the third target percentage 430 and the second target percentage 420 greater than the target percentage 330 of disk drives of the third configuration and the target percentage 320 of disk drives of the second configuration. Of course, the range can be divided into other numbers of portions corresponding to other target percentages of different configurations within the scope of the invention of the present applications.

Figure 10:
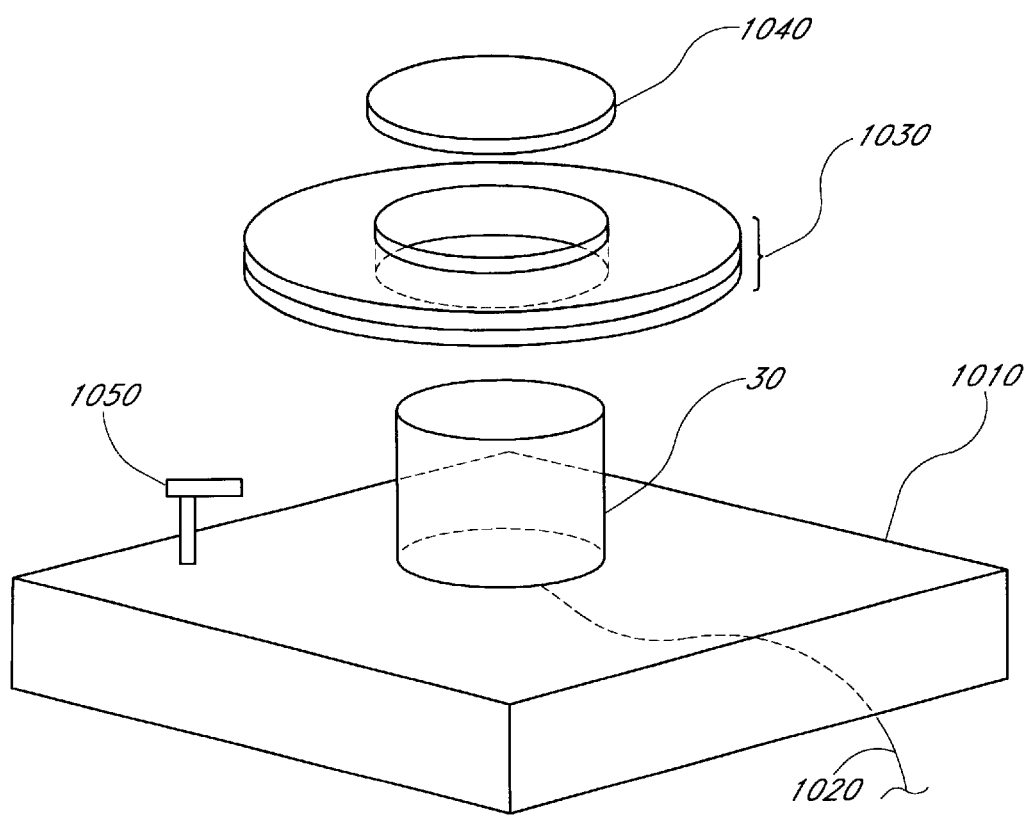
FIG. 10 pictorially illustrates a spindle motor operating characteristic tester that is capable of measuring NRRO.

FIG. 10 pictorially illustrates an apparatus 1000 for allocating a spindle motor 30 from a population of spindle motors to an appropriate disk drive configuration according to an operating characteristic. As discussed above, the operating characteristic of the population of spindle motors can vary over a range. The apparatus 1000 could measure, for example, NRRO. The apparatus 1000 can include a vibration-isolating platform 1010 that has an electrical connection 1020 to which the spindle motor 30 can be electrically connected.

The apparatus 1000 could also include a platter pack 1030 and a connector 1040 for attaching the platter pack 1030 to the spindle motor 30. The platter pack 1030 could comprise at least one platter, each platter being characterized so as to have a known amount of the operating characteristic, such as NRRO. In another variation, the platter pack 1030 comprises at least one platter, each platter having a negligible amount of the operating characteristic, such as NRRO. The platter pack 1030 could be made to simulate the disk drive configuration that corresponds to the least desirable performance of the operating characteristic.

The connector 1040 is preferably configured to rapidly fasten the platter pack 1030 to the spindle motor 30. The apparatus 1000 also includes a measurement device 1050 for measuring the operating characteristic.

The apparatus 1000 could alternately comprise a fixture for temporarily connecting the spindle motor to the apparatus, the fixture assuring adequate physical and electrical connection. In another variation, the vibration-isolating platform 1010 of the apparatus 1000 is configured so that the spindle motors 30 can be manually loaded thereon, and the connector 1040 is configured to manual attach the platter pack 1030 to the spindle motor 30. In yet another variation, the vibration-isolating platform 1010 of the apparatus 1000 is configured for automated load of the spindle motor 30 and the connector 1040 is configured for automated attachment of the platter pack 1030 to the spindle motor 30.

What is claimed is:

1. A method of manufacturing a population of disk drives comprising a first disk drive configuration having a spindle motor and a second disk drive configuration having a spindle motor, the method comprising:
    obtaining a population of spindle motors according to a common spindle motor design, each of the spindle motors in the population having an operating characteristic in a range, the range comprising a first portion and a second portion;
    identifying a first group of the spindle motors corresponding to the first portion of the range;
    identifying a second group of spindle motors corresponding to the second portion of the range;
    allocating the first group of spindle motors to the first disk drive configuration; and
    allocating the second group of spindle motors either to the first disk drive configuration or to the second disk drive configuration.

2. The method of claim 1, wherein the population of disk drives further comprises a third disk drive configuration having a spindle motor, and wherein the range further comprises a third portion, the method further comprising:

identifying a third group of spindle motors corresponding to the third portion of the range; and allocating the spindle motors corresponding to the third portion of the range either to the first disk drive configuration, to the second disk drive configuration, or to the third disk drive configuration.

3. The method of claim 2, wherein the third disk drive configuration comprises a disk drive having at least three platters.

4. The method of claim 2, wherein the third disk drive configuration comprises a disk drive having at least two platters.

5. The method of claim 2, wherein the third disk drive configuration comprises a disk drive having a high seek performance.

6. The method of claim 2, wherein the third disk drive configuration comprises a disk drive having a nominal seek performance.

7. The method of claim 2, wherein the third disk drive configuration comprises a disk drive having a high acoustic performance.

8. The method of claim 2, wherein the third disk drive configuration comprises a disk drive having a nominal acoustic performance.

9. The method of claim 2, wherein the third disk drive configuration comprises a disk drive having a high spindle speed.

10. The method of claim 2, wherein the third disk drive configuration comprises a disk drive having a nominal spindle speed.

11. The method of claim 1, wherein the operating characteristic is a track-following characteristic.

12. The method of claim 1, wherein the operating characteristic is non-repeatable runout.

13. The method of claim 1, wherein the operating characteristic is an acoustic characteristic.

14. The method of claim 1, wherein the first disk drive configuration comprises a disk drive having at least one platter.

15. The method of claim 1, wherein the second disk drive configuration comprises a disk drive having at least two platters.

16. The method of claim 1, wherein the first disk drive configuration comprises a disk drive having a low seek performance.

17. The method of claim 1, wherein the second disk drive configuration comprises a disk drive having a nominal seek performance.

18. The method of claim 1, wherein the first disk drive configuration comprises a disk drive having a low acoustic performance.

19. The method of claim 1, wherein the second disk drive configuration comprises a disk drive having a nominal acoustic performance.

20. The method of claim 1, wherein the first disk drive configuration comprises a disk drive having a low spindle speed.

21. The method of claim 1, wherein the second disk drive configuration comprises a disk drive having a nominal spindle speed.

22. The method of claim 1, further comprising:

determining a target percentage of the population of disk drives corresponding to the second configuration;

measuring the operating characteristic for each of a sample group of the population of spindle motors; and setting a first spindle motor sort boundary of the measured operating characteristic to define the first portion of the range and the second portion of the range, the first spindle motor sort boundary set to produce at least the target percentage of the population of disk drives corresponding to the second configuration.

23. The method of claim 22, wherein the step of measuring the operating characteristic for each of the sample group of the population of spindle motors comprises simulating an operating condition corresponding to a three platter load.

24. The method of claim 22, further comprising:

measuring the operating characteristic of each of the population of spindle motors; and tagging the spindle motors having a measured operating characteristic in the second portion of the range to produce at least the target percentage of the population of disk drives corresponding to the second configuration.

25. The method of claim 24, wherein the step of measuring the operating characteristic of each of the population of spindle motors comprises simulating an operating condition corresponding to a three-platter load.

26. The method of claim 22, wherein the step of determining the target percentage of drives comprises determining a percentage of disk drives of the second configuration to be sold and determining an expected disk drive yield loss percentage.

* * * * *